March 1, 1927.
H. S. FULLERTON
1,619,340
WORK HOLDER
Filed March 1, 1924     2 Sheets-Sheet 2
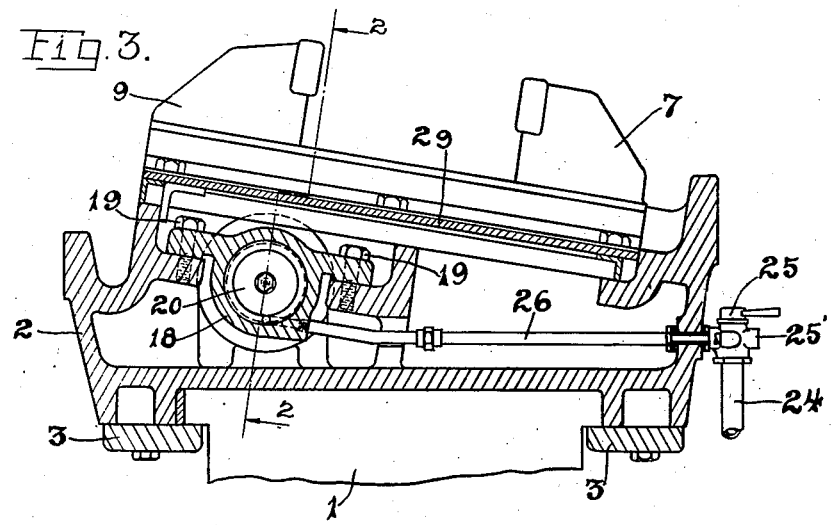
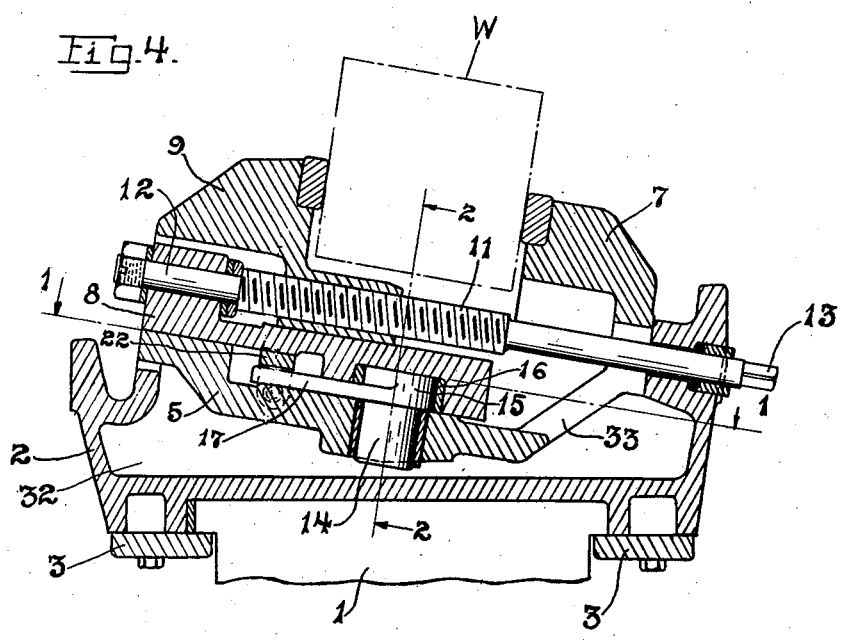
INVENTOR
H. S. Fullerton
BY
ATTORNEY Patented Mar. 1, 1927.

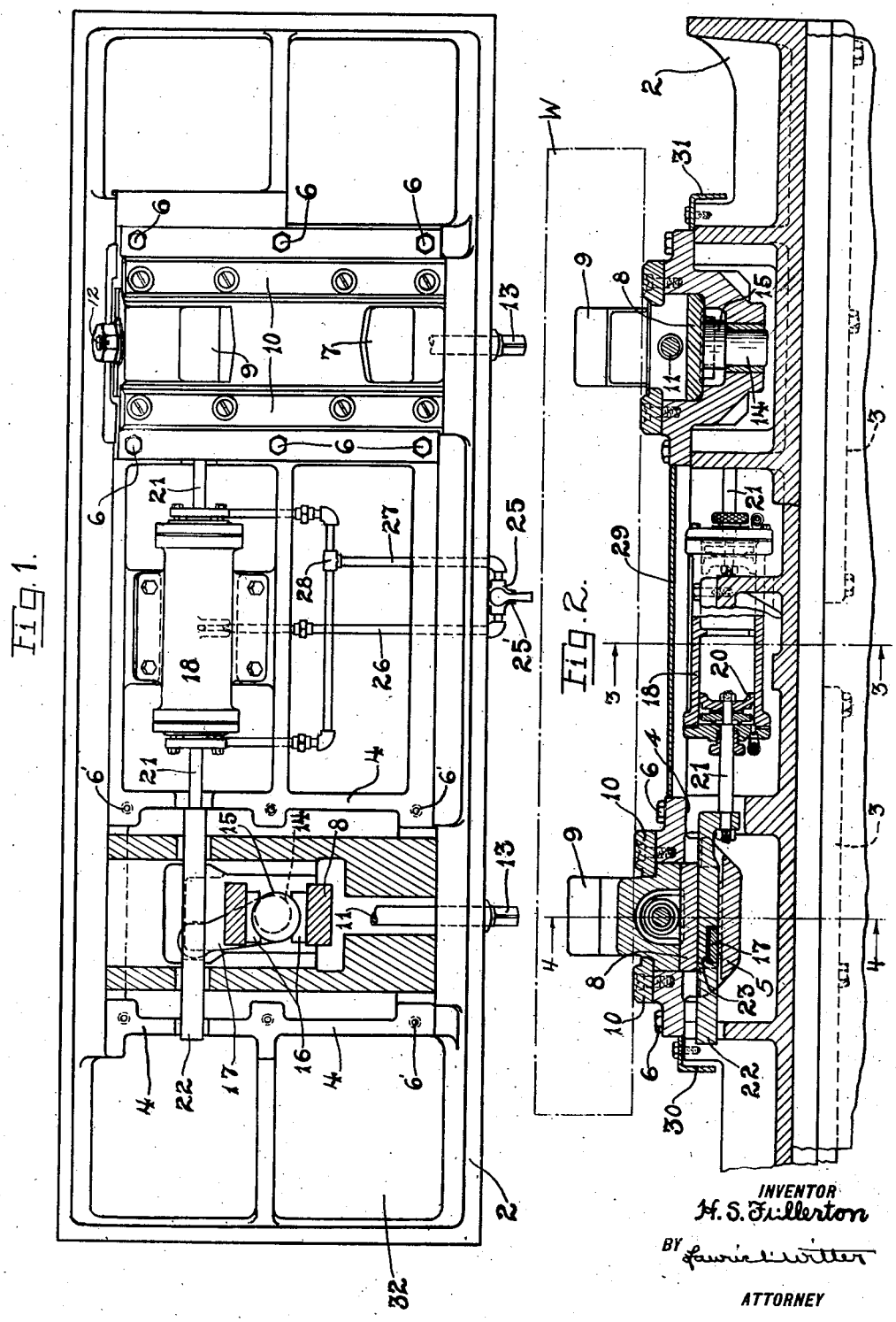

1,619,340

UNITED STATES PATENT OFFICE.

HERBERT S. FULLERTON, OF PHILADELPHIA, PENNSYLVANIA, ASSIGNOR TO NILES-BEMENT-POND COMPANY, OF NEW YORK, N. Y., A CORPORATION OF NEW JERSEY.

WORK HOLDER.

Application filed March 1, 1924. Serial No. 696,378.

This invention relates to work holders of the vise type wherein a pair of work holding jaws are adapted to receive and grip a work piece therebetween. The invention herein comprises such a vise wherein one jaw is normally fixed and the other jaw is adjustably mounted on a slide which in turn is adapted to be power operated to securely grip a work piece between the jaws, the connection between the slide and movable jaw providing relative adjustment of the jaws for different size work pieces. One object of the invention is to provide an improved work holder of this type.

Another object of the invention is to provide an improved work holder particularly adapted to receive and secure a large metal billet while the same is being milled or otherwise worked upon. In such construction, two pairs of work holding jaws are provided and so relatively arranged on their support as to receive the billet between the work holding jaws of both work holders. Power operated means is provided in connection with the jaws for gripping the billet therebetween.

A further object of the invention is to provide a work holder of the type last stated in which a unitary power means, preferably of the fluid operated type and mounted on the support between the said two pairs of jaws, is provided for operating the jaws to securely grip a work piece therebetween.

With the above and other objects in view, my invention consists in the features of construction and operation set forth in the following specification and illustrated in the accompanying drawings. In such drawings annexed hereto and forming a part of this specification, I have shown one preferred embodiment of my invention but it will be understood that the invention can be otherwise embodied and that the drawings are not to be construed as defining or limiting the scope of the invention, the claims appended to this specification being relied upon for that purpose.

Referring to the figures of the drawings:

Figure 1 is a plan view, partially in section on line 1—1 of Fig. 4, showing my improved work holder.

Fig. 2 is a vertical longitudinal sectional view taken on lines 2—2 of Figs. 3 and 4.

Fig. 3 is a vertical transverse sectional view taken on line 3—3 of Fig. 2.

Fig. 4 is a vertical transverse sectional view taken on line 4—4 of Fig. 2.

While the work holder comprising my invention is adapted to be used in various types of machines and for various tooling operations, it is particularly adapted to be used in a billet milling or deseaming machine shown in the Patent No. 1,545,763 to W. J. Hagman dated July 14, 1925. Billets which have been sheared from a rolled bar of steel have surface imperfections comprising cracks or seams which must be removed before the billet can be used for manufacturing purposes. The machine comprised in the above mentioned application provides a work holder particularly adapted to receive and rigidly support a billet during operation thereon by a milling cutter to cut out the cracks and seams above mentioned. The present invention has for its primary object to provide a work holder particularly adapted to receive and support such a billet.

Referring specifically to the drawings by reference characters, 1 indicates the bed of a machine on which is slidably mounted a work support or table 2, the usual gibs 3 being provided for holding the table on the bed. The table is formed in the shape of a trough or basin for receiving a coolant liquid as it drains from the cutter and work piece during the milling operation.

Mounted on bearing surfaces 4 adjacent each end of the table is the base piece 5 of a work holding vise, this piece being secured by bolts 6 threaded into holes 6'. An upwardly extending work engaging jaw 7 is preferably integral with one end of each base 5. A slide 8 movable toward and from the jaw 7 is mounted in each base 5 and supports a cooperating work engaging jaw 9 thereon, a pair of gibs 10 being adapted to hold the slide and jaw within the base 5. A screw 11 journaled at 12 in an upwardly extending portion of the slide is threadedly connected to the jaw 9. The outer end of the screw at the front of the table is squared at 13 whereby the screw can be rotated to adjust the jaw 9 toward and from the jaw 7. The slide 8 and jaw 9 are power operated to grip a work piece by means of the following mechanism.

Rotatably mounted in the bottom of each base 5 is a member 14 having an upwardly extending eccentric or cam 15 seated between a pair of hardened steel shoes 16 within a recess in the underside of the slide 8. The arrangement is such that rotation of the member 14 will move the slide and jaw 9 toward and from the jaw 7. An operating arm 17 extends outwardly from the member 14.

I preferably operate the two members 14 from a unitary power means, preferably of the fluid operated type and mounted on the support or table 2 between the two pairs of jaws as illustrated in Fig. 1, though it will be understood that my invention is not to be so limited except as defined by the appended claims.

A double cylinder 18 is mounted on the table between the two pairs of jaws, bolts 19 being adapted to secure the same in place. Slidably mounted in each half of the cylinder is a piston 20 having a piston rod 21 connected thereto and extending outwardly through its respective end of the cylinder and toward the pair of jaws it is adapted to operate. A rod 22 is connected to the end of each piston rod and is slotted at 23 to receive the free end of an arm 17 therein. Movement of the piston rod will operate through the arm 17 to rotate the cam member 14.

Fluid pressure is supplied to the cylinder as follows: A supply pipe 24 branches at a valve 25. One branch 26 leads into the cylinder between the pistons and the other branch 27 branches again at 28 and leads into the ends of the cylinder. Movement of the valve to one position admits fluid through the pipe 26 and opens branch pipe 27 to the exhaust 25'. Movement of the valve to another position admits fluid through the pipe 27 and opens the branch pipe 26 to the exhaust 25'. Fluid pressure admitted through the pipe 26 is adapted to force the pistons and piston rods outwardly and rotate the cam members 14 in a direction to grip a work piece held between the jaws. Fluid pressure admitted through the pipe 27 is adapted to force the pistons and piston rods inwardly and rotate the cam members 14 in a direction to release a work piece held between the jaws.

It will be noted that the base 5 of the work holding jaws is mounted on an angle to the horizontal whereby the work piece W is held in the inclined position illustrated in Fig. 4. During the cutting operation, a liquid is flowed over the cutter and work whereby to cool the cutter and to wash away the chips. The inclined position of the work greatly facilitates this operation. A cover plate 29 is provided for housing the cylinder 18 and preventing liquid and chips from entering this chamber. Other plates 30 and 31 are provided for directing the liquid downwardly into the table basin or chamber 32. The base 5 furthermore is cored out at 33 to permit passage of the liquid therethrough.

It is believed that the invention and the operation thereof will be clearly understood without further description herein. To close both pairs of jaws onto a work piece or to release the same therefrom, the operator has only to rotate the valve 25. The two pistons 20, while operating within a common cylinder, are nevertheless in no way dependent on each other and both therefore operate to independently grip the work piece with equal pressure. The movement of the slide 8 by the cam 15 is small and therefore operates with great power. The jaws can be very accurately adjusted to receive work pieces varying in size by rotating the screws 11.

What I claim is:

1. A work holder comprising the combination of a support, a work engaging jaw thereon, a slide on the support movable toward and from the jaw, a second jaw, means connecting the second jaw and slide for relative adjustment toward and from the first jaw, a member rotatably mounted in the support and having an eccentric portion engaging the slide, an outwardly extending arm on the member, and power operated means connected to the arm and adapted to rotate the member and slide to grip a work piece between the jaws.

2. A work holder comprising the combination of a support, a work engaging jaw thereon, a slide on the support movable toward and from the jaw, a second jaw mounted on the slide, a screw connecting the second jaw and slide for relative adjustment toward and from the first jaw, means including a cam operatively connecting the slide and support and adapted to move the slide to grip a work piece between the jaws, and power operated means connected with the cam means for operating the same.

3. A work holder comprising the combination of a support, a work engaging jaw thereon, a slide on the support movable toward and from the jaw, a second jaw, means connecting the second jaw and slide for relative adjustment toward and from the first jaw, a cam operatively connected to the slide, an arm extending outwardly from the cam, and a fluid operated piston having a piston rod extending transversely of and operatively connected to the arm, movement of the piston being adapted to rotate the cam and move the slide.

4. In a machine tool, the combination of a support, two relatively spaced pairs of work holding jaws thereon, mechanism beneath each pair of jaws for effecting a relative movement of the jaws to grip a work piece therebetween, a cylinder mounted on the support between the two pairs of jaws, and piston means within the cylinder operatively connected to the two mechanisms for operating the same.

5. In a machine tool, the combination of a support, two relatively spaced pairs of work holding jaws thereon, mechanism beneath each pair of jaws for effecting a relative movement of the jaws to grip a work piece therebetween, a cylinder mounted on the support between the two pairs of jaws, and a pair of pistons mounted in the cylinder and respectively connected to the said mechanisms for operating the same.

6. In a machine tool, the combination of a support, two relatively spaced pairs of work holding jaws thereon, mechanism including a rotary cam beneath each pair of jaws for effecting a relative movement of the jaws to grip a work piece therebetween, a cylinder mounted on the support between the two pairs of jaws, and a pair of pistons mounted in the cylinder and respectively connected to the said cams for rotating the same to effect gripping and releasing of a work piece between the pairs of jaws, fluid pressure admitted to the cylinder between the pistons being adapted to rotate the cams in one direction and fluid pressure admitted to the ends of the cylinder being adapted to rotate the cams in the opposite direction.

In testimony whereof, I hereto affix my signature.

HERBERT S. FULLERTON.